United States Patent

Schroedter

[15] 3,634,914
[45] Jan. 18, 1972

[54] GIRT BAR
[72] Inventor: Leonard Schroedter, La Palma, Calif.
[73] Assignee: McDonnell Douglas Corporation
[22] Filed: Nov. 28, 1969
[21] Appl. No.: 880,532

[52] U.S. Cl. ................... 24/201, 16/171, 16/176, 244/137
[51] Int. Cl. ........... A44b 17/00, E05d 1/06, B64c 1/22
[58] Field of Search ................................. 24/201; 16/171–175, 149, 181; 244/137, 138

[56] References Cited

UNITED STATES PATENTS

| 1,805,324 | 5/1931 | Bird | 16/149 X |
| 1,557,858 | 10/1925 | Maier | 16/128 X |
| 2,346,977 | 4/1944 | La Sha | 16/171 X |
| 2,926,382 | 3/1960 | Knese et al. | 16/176 |
| 3,338,609 | 8/1967 | Banas M | 16/149 X |

*Primary Examiner*—Paul R. Gillia
*Attorney*—Walter J. Jason, Donald L. Royer and Ming Y. Moy

[57] ABSTRACT

A mounting and latching device for use with an emergency evacuation slide carried by an aircraft. The device includes a mounting bar having locking members at each end thereof and a positioning mechanism for placing the locking members in a secured position within a fitting which is secured to a door of the aircraft, or a locked position within a fitting which is secured to the floor of the aircraft.

3 Claims, 5 Drawing Figures

PATENTED JAN 18 1972
3,634,914
SHEET 1 OF 2
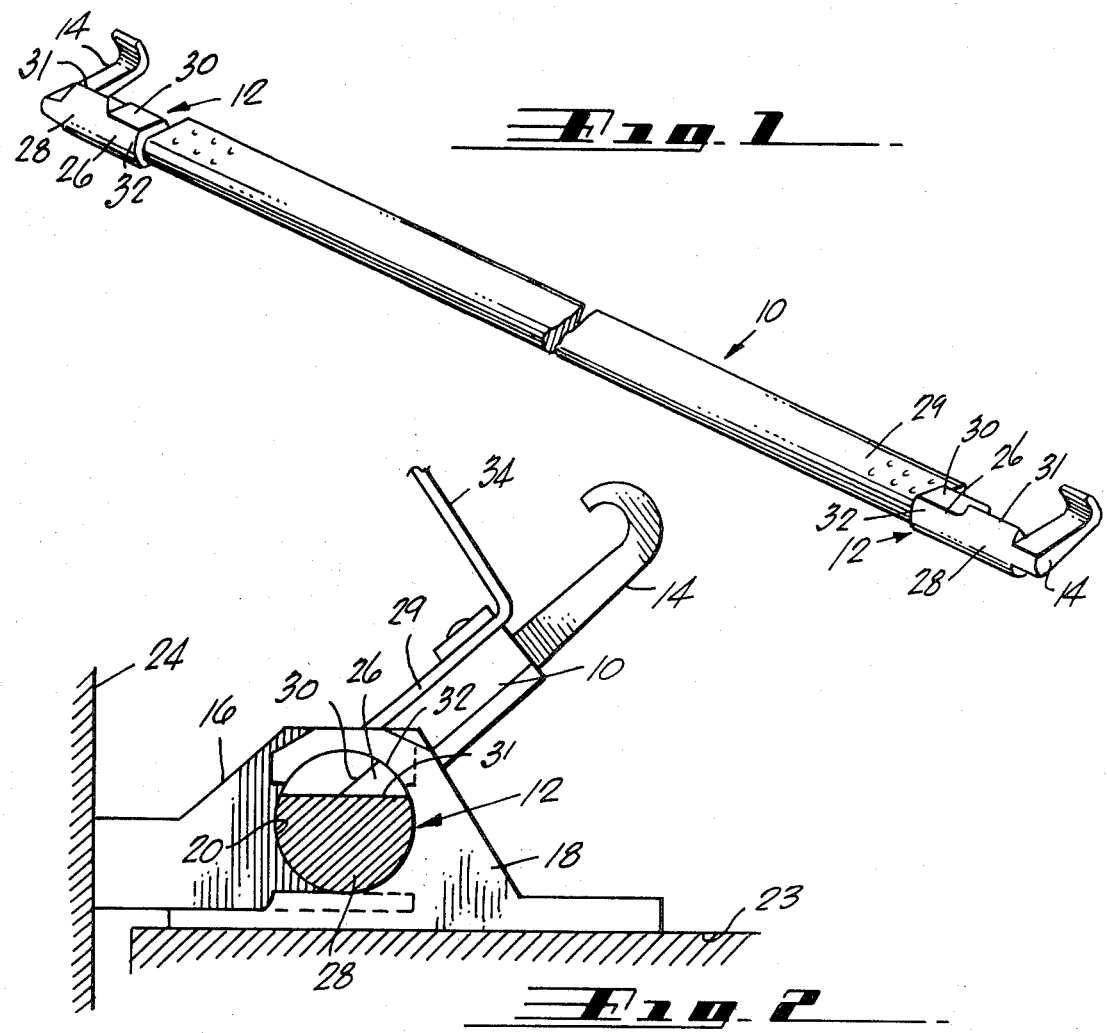
INVENTOR.
LEONARD SCHROEDTER
BY Ning Y. Moy
-ATTORNEY- INVENTOR.
LEONARD SCHROEDTER
BY
Ming Y. Moy
-ATTORNEY-

GIRT BAR

BACKGROUND OF THE INVENTION

The field of this invention is in the area of aircraft emergency evacuation chutes, more specifically, this invention relates to a mounting and securing assembly to which the chute deployment device is secured.

In the aircraft art it is common to employ an apparatus to evacuate passengers in the event of an emergency landing. One such apparatus is an inflatable slide which when actuated allows a safe disembarkment of the passengers. It is necessary to provide such an evacuation apparatus because present day aircraft are so large that in an emergency landing the passenger doors may be several feet above the ground. Further, it is necessary to have the evacuation slide actuated in the shortest possible time in an emergency situation.

This invention is to be associated with an evacuation slide located in an aircraft. The slide is retained normally in a deflated condition within a container mounted on the interior slide of each passenger door. To actuate the evacuation slide in the shortest possible time, it is desirable to actuate the slide upon opening of the aircraft door. It is for this purpose a latching and mounting assembly of this invention is employed.

Heretofore, the latching and mounting assemblies which have been used to secure the evacuation slide have not been designed to facilitate ease of operation. The conventional latching assemblies usually require a substantial force to affect the latching operation and likewise the substantial force to affect the unlatching operation. It is desirable to have a latching and mounting assembly which can be operated with a minimum of effort yet provides a substantial locking force.

SUMMARY OF THE INVENTION

In carrying out the principles of this invention in accordance with one embodiment thereof, there is provided a mounting and latching assembly for use with an emergency evacuation slide normally employed in a commercial aircraft. The mounting and latching assembly comprises a girt bar for securing a deployment strap of an inflatable chute, and a pair of locking members positioned at opposite ends of the girt bar. The latching and mounting assembly further includes a pair of support fittings mounted to the door of the aircraft and a pair of lock fittings secured on the floor of the aircraft. When the aircraft door is in a closed position, the locking members are received and secured in the fittings which are mounted to the aircraft door. Immediately prior to the opening of the aircraft door due to an emergency, a position mechanism is actuated to place the locking members from the secured position on the aircraft door to a locked position within the fittings which are secured to the aircraft floor thereby allowing proper securing of the girt bar and the chute deployment strap to the aircraft structure to facilitate evacuation of passengers from the aircraft.

BRIEF DESCRIPTION OF THE DRAWINGS

FIG. 1 is a perspective view showing the girt bar of this invention;

FIG. 2 is an end view with an end portion of the girt bar removed, when the door is in a closed position;

FIG. 3 is a pictorial view showing the girt bar secured to the door when open;

DESCRIPTION OF THE SHOWN EMBODIMENT

Figure 4:
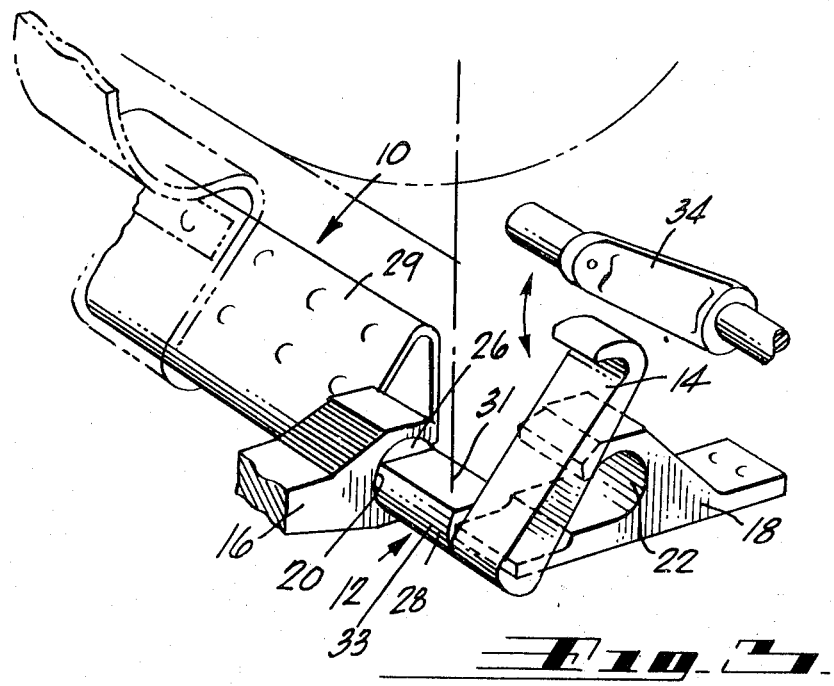
FIG. 4 is an end view similar to FIG. 2, wherein the girt bar has been rotated 45°.

Referring to the drawings and more particularly to FIG. 1, there is shown a mounting or latching bar, generally indicated at 10. The bar 10 is an elongated member and of substantially flat configuration. Positioned at each end of the girt bar 10 is an integral locking member generally indicated at 12. Adjacent each locking member 12, there is fixed a hook-shaped locking arm 14 extending laterally from the bar 10.

Referring now to FIGS. 2 through 5, the locking members 12 are shown as being received in fittings 16 and 18. The fittings 16 and 18 are substantially similar to each other with each having a substantially C-shaped section 20 and 22 into which the ends of the latching bar 10 may be locked. The fitting 16 is secured to the door 24 while the fitting 18 is secured to the aircraft floor 23. When the door 24 is in its closed position the fittings 16 and 18 are located adjacent to and axially aligned with each other, and locking member 12 is locked in the C-shaped section 20 of the fitting 16 while being releasably engaged within the C-shaped portion 22 of the fitting 18.

The locking members 12 on each side of the bar 10 are identical to each other, thus only one will be described. Each locking member 12 comprises a plurality of camlike keepers 26 and 28. The keepers 26 and 28 are in a juxtaposed relationship with each other and are located intermediate the end of the flat portion 29 of the latching bar 10 and the hook-shaped arm member 14.

Cam keeper 26 is adapted to be received and secured within the fitting 16 or be released therefrom. Cam keeper 26 has a cam surface 32 and a flat faced portion 30. The cam keeper 26 may be freely moved in and out of the C-shaped opening 20 when the flat portion 30 is in a position substantially perpendicular to the plane of the opening of the C-shaped section 20 of the fitting 16. Similarly, the cam keeper 28 has a cam surface 33 and a flat surface 31 and it is adapted to be received and secured within the fitting 18 and may be freely disengaged from the opening of the C-shaped portion 22.

FIG. 2 specifically illustrates that when the cam keeper 26 is locked in the door fitting 16, its flat face surface 30 is positioned at approximately 45° from the adjacent flat surface 31 of the cam keeper 28. In this position, the cam surface 32 of cam keeper 26 overrides the opening of the C-shaped portion 20, thus locking the cam keeper 26 in the C-shaped portion 20. While the cam keeper 26 is located in the C-shaped section 20 of the fitting 16, the cam keeper 28 is in position for disengagement from the C-shaped section 22 of the fitting 18 since the C-shaped opening of the section 22 of the fitting 18 is larger than the width of the cam surface 33 of the keeper 28.

Figure 5:
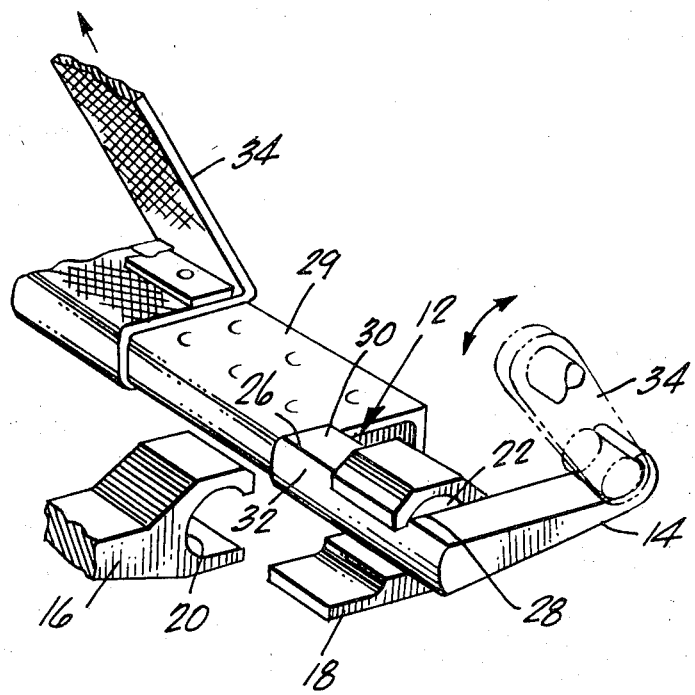
FIG. 5 is a pictorial view showing the girt bar locked to the floor with the escape chute in a deployment condition.

When the door 24 is in a closed position, the bar 10 is secured to the door fitting 16 as described above and shown in FIG. 3. When an emergency arises aboard the aircraft, a positioning mechanism such as lock lever 34 is actuated either manually or remotely to engage the hook-shaped locking arm member 14 and to rotate the arm member 14 to a position as illustrated in FIGS. 4 and 5. This rotational movement causes the locking members 12 and the latching bar 10 to rotate approximately 45° as a unit and, therefore, changing the positions of the cam locking keeper 26 and 28 relative to the fixed fitting 16 and 18.

FIG. 4 specifically shows that when the cam keeper 28 is locked in the floor fitting 18, its flat surface 31 is positioned at approximately 45° from the adjacent flat surface 30 of the cam keeper 26. In this position, the cam surface 33 overrides the opening of the C-shaped section of the fitting 18, to provide a positive locking to take place between the two components. While the cam keeper 28 is locked to the floor fitting 18, the cam keeper 26 is free to be disengaged from the door support fitting 16 thereby allowing the door 24 to open and to cause deployment of the escape chute.

The separation of the bar 10 and the locking member 12 from the door fitting 16 is illustrated in FIG. 5. Also shown in this view is the chute deployment strap or girt 36 attached to the latching or girt bar 10. Bar 10 is secured to the floor of the aircraft by means of the locking members 12 and floor fittings 18. When the aircraft door 24 is opened, a pulling force is applied through the strap or girt 36 to cause release of a chute or slide from a container (not shown). The evacuation chute falls free by the pull of gravity and is inflated automatically by suitable means.

I claim:

1. A mounting and latching assembly for use with an emergency evacuation slide carried by an aircraft, said assembly comprising:
   a bar member attached to the slide;
   a pair of locking members positioned on said bar, each of said locking members including at least two keepers of generally C-shaped cross section;
   a pair of support fittings mounted to a door of said aircraft for supporting said bar;
   a pair of lock fittings secured to aircraft structure adjacent the door wherein each of said support fittings and each of said lock fittings includes means defining a C-shaped opening for receiving and predeterminately retaining at least one of said keepers; and
   positioning means in operative association with said locking members for predeterminately moving said locking members from a position in which said bar member is secured to said door and released from said structure to a position in which said bar member is locked to said structure and released from said door whereby said positioning means predeterminately cause the slide to be attached to the aircraft structure for emergency deployment thereof.

2. The mounting and latching assembly as recited in claim 1 wherein said positioning means comprise:
   a locking arm member connected to at least one of said locking members; and
   an actuation arm for contacting said locking arm member to predeterminately rotate said arm connected locking member from the position in which said bar member is secured to the door to the position in which said bar member is locked to the structure.

3. The mounting and latching assembly as recited in claim 1 wherein said keepers of each locking member are out of rotational alignment, and wherein said positioning means include a pair of locking arm members, each locking arm member being positioned on an opposite end of said bar member, said locking arm members including means for engaging actuating means for rotating said locking members so that said keepers may be predeterminately engaged with or disengaged from said support and lock fittings.

* * * * *